July 19, 1960 O. F. VOGEL ET AL 2,945,989

PLUG-IN CIRCUIT UNITS

Filed Aug. 15, 1957

INVENTORS:
OTTO F. VOGEL
ROBERT B. BONNEY
LLOYD S. PRESTON

BY Harry R. Lubcke
AGENT

United States Patent Office 2,945,989

Patented July 19, 1960

2,945,989

PLUG-IN CIRCUIT UNITS

Otto F. Vogel, Santa Ana, Robert B. Bonney, Tustin, and Lloyd S. Preston, La Habra, Calif., assignors to Electronic Engineering Company of California, Santa Ana, Calif., a corporation of California Filed Aug. 15, 1957, Ser. No. 678,399

3 Claims. (Cl. 317—101)

Figure 1:
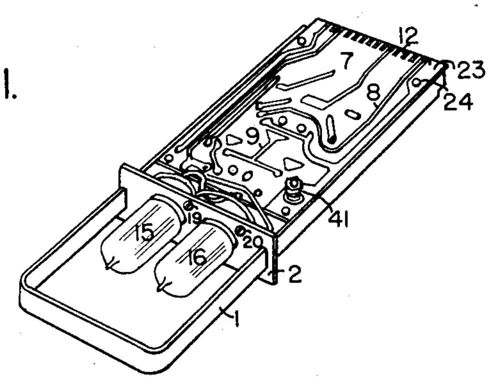

This invention relates to plug-in electronic circuits and particularly to such circuits of which a plurality comprises a coactive apparatus.

A wide variety of modern electronic equipment utilizes certain specific circuits as building blocks. Such equipment embraces computers, data handling devices, instrumentation, telemetering apparatus, automation control and like devices. The specific circuits embrace flip-flops, multivibrators, digit matrixes, delay units, pulse amplifiers, diode logics, cathode followers, neon tube drivers and equivalent circuits. Each equipment may employ as many as hundreds of the circuits mentioned in various combinations.

It will be understood that such complexity calls for a physical arrangement of apparatus not heretofore evolved. Each physical aspect takes on an importance because of the multiplicity involved. While it is possible to construct such equipment in a single large chassis, or on several relatively large chassis, such construction is impractical.

It has been possible to accomplish a notable advance in this art by fabricating such equipment of circuits constructed upon thin individual frames. These are arranged in stacked rows in an enclosing rack. The rear of each frame carries an electrical connection plug which mates with jacks in the rack. Each frame is vertically disposed in notched members of the rack. A panel disposed transverse of the frame to one side of center of the length thereof creates a partition in the rack because of the multiplicity of frames therein. This separates the apparatus into two volumes. An insulating etched circuit card carries the major portion of the circuit components behind the panel and to the rear as far as the electrical connection plug. Other components, particularly heat-producing vacuum tubes, are positioned in front of the panel by sockets mounted thereon. In this way a desirable control over cooling is attained, the circuit components may remain relatively cool while the volume containing the vacuum tubes may be allowed to reach a higher temperature. With a filtered forced-air flow almost any cooling balance may be maintained with this construction because it is contained within a rack enclosure. The part of the frame in front of the vacuum tubes forms a handle. This allows convenient insertion and removal of any frame and also acts as a guard in front of the vacuum tubes. The units are rigid, light in weight, of simple construction and present an electrically "dead front"; i.e., electrical connections or terminals are not found in front of the panels.

An object of this invention is to provide effective unitization of complex apparatus.

Another object is to facilitate cooling apparatus by forming plural separate volumes therein.

Another object is to arrange apparatus in a compact manner, yet to dispose and orient the units thereof for efficient cooling.

Another object is to provide a frame for each unit so constituted that a portion thereof acts both as a handle for the convenient insertion and removal of the unit and as a guard for vacuum tubes carried thereby.

Another object is to provide electrical connections which are made when a unit is inserted in the apparatus and broken when it is removed.

Another object is to provide apparatus, the units of which are arranged in rows and the rows stacked one above the other in a closed cabinet.

Another object is to provide units of apparatus which are light in weight, structurally strong, accessible and simple to manufacture.

Figure 2:
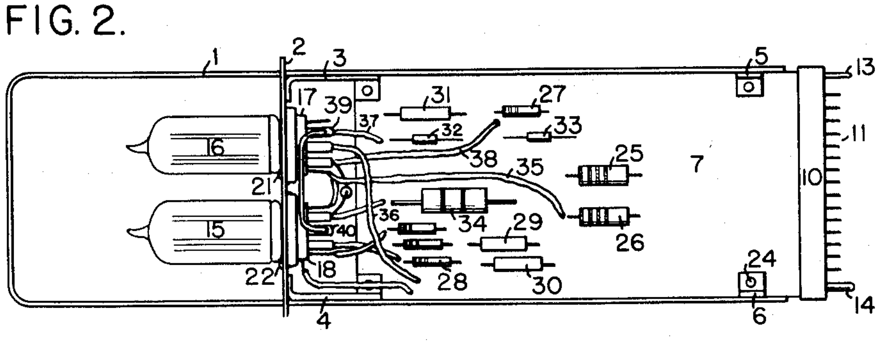
Figure 3:
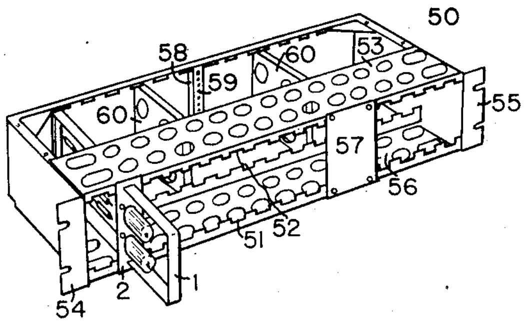

Other objects of this invention will become apparent upon reading the following detailed specification and upon examining the accompanying drawings, in which:

Fig. 1 shows a perspective view of one typical unit oriented on its side to show the etched circuit portion, Fig. 2 shows a side elevation of one unit oriented to show circuit components on the side opposite the etched circuit, and Fig. 3 shows one section of the rack into which the units fit.

In Figs. 1 and 2 numeral 1 identifies the frame of the plug-in unit. This is the main structural member and extends around three sides of the unit. Panel 2, which is both longer and wider than the frame, is rigidly attached thereto about three-eighths of the distance away from the front end. Angle members 3 and 4 are spot welded to accomplish this, with two welding spots on the frame and one spot on the panel at each bracket. Two additional and smaller angle members 5 and 6 are also provided near the open end of the frame. All of these members may be formed of "stiff" aluminum, such as the 50-52H34, of the order of 1/16" thick. The resulting frame is extremely rigid. Alternately, the panel may be of 61ST4 aluminum alloy.

An insulating circuit board 7 completes the structure of the unit. It is fastened to each of the four angle members 3, 4, 5 and 6 by a rivet of soft material, so that an intimate joinder is accomplished. Board 7 is preferably an epoxy-glass material of the order of 1/16" thick possessing a high degree of stiffness and thermal stability without brittleness. Such material is suitable for etched circuit techniques, which are preferably employed for the major portion of the circuit wiring. Illustrative conductors produced according to this known process are shown at 8 and 9 in Fig. 1, in which figure the conductor side of the board is shown.

An electrical connection plug 10 is rigidly attached to board 7 and the several conductors thereof connected to the several pins 11 of the plug by suitable extension of the conductors to the end of the board, as seen at the upper rear portion of Fig. 1. The attachment and connecting are simultaneously accomplished by dip soldering. The conductors contact short extensions 12 of pins 11. The former extend at right angles to the latter and through board 7.

The body of plug 10 is a solid insulator of good electrical quality. Two positioning pins are provided, one 13 at the top of the plug and another of larger diameter 14 at the bottom. In plugging the unit into a jack these pins enter first to establish alignment and the different diameters prevent the unit from being inserted upside-down.

The wide variety of circuits that may be accommodated in this unit has been mentioned. In the ones illustrated two vacuum tubes 15 and 16 are employed. These are mounted in sockets 17 and 18, which in turn are fastened in holes in panel 2 by means of two screws each, of which screws 19 and 20 are visible in Fig. 1 and screws 21 and 22 in Fig. 2.

Each of these tubes may carry two sets of electrodes in each envelope, making a total of four vacuum tubes. There may be only one tube per envelope, there may be only one envelope, or there may be no vacuum tubes mounted at all, depending upon the circuit of the unit. For one envelope the remainder of the panel is without holes and for no vacuum tubes the whole panel is without holes. This is to form separate cooling ducts from the panel to the rear and from the panel to the front of all the units as assembled in a complete apparatus.

One end pin of the group of fifteen identified in general as 11 is conveniently made the ground circuit connection, as the right hand one in Fig. 1. Etched circuit wiring is then arranged to electrically connect to the rivet that holds the board to the frame, which then grounds frame 1, panel 2, etc. This is shown in Fig. 1 as conductor 23 and rivet 24.

Fig. 2 shows the side of the circuit board opposite to that shown in Fig. 1 and shows the components rather than the etched circuit wiring. The configuration of each depends upon the particular circuit desired and is subject to wide variation according to the needs and desires of the fabricator, including the presence of etched circuit connections and components on both sides of the board.

Normally, however, the several circuit components or elements, such as resistors 25, 26, 27, 28, etc., mica capacitors 29, 30, 31, etc., crystal diodes 32, 33, etc., molded paper capacitor 34, etc. are fastened to board 7 by the connecting wires or pigtails extending through holes in the board. On the opposite side the required circuit is traced by the known photographic etched-conductor process. When all the components are in place the board is immersed in a bath of molten solder having a horizontal surface greater in extent than the area of the board. All the connections are then soldered in one operation.

Certain connections must be made to the vacuum tubes and this is accomplished in this circuit entity by usual insulated wires 35, 36, 37, 38, etc. These wires are connected to the conductors of the circuit board in the molten solder bath and the connections to the lugs 39, 40, etc. of the sockets by the usual soldering iron process.

Usually, all the circuit components of any of the physical entities according to this invention are of the fixed type, but this is not necessarily so. At 41 in Fig. 1 the screwdriver adjustment of a variable resistor is shown above the circuit board. In Fig. 1 only the connection side of a circuit is shown, whereas in Fig. 2 only the component side is shown. In both, the elements on the opposite side of the boards are not shown. To indicate the circuit variation possible, the circuits shown in Figs. 1 and 2 are not the same.

Fig. 3 shows a rack 50 for mounting a plurality of plug-in units 1. In the rack shown fifteen such entities may be mounted vertically, side by side. The frame 1 of each slides into a pair of notches 51, 52 in the front surface of the rack. These notches are positioned vertically one above the other. A corresponding pair are located straight back in the rear surface of rack piece 53. In this way each unit is held at four points.

Only one unit is shown in place in Fig. 3 so that the construction of the rack may be seen. It will be recognized that the rack is constructed to be stacked one above the other in the well-known 19" (wide) rack or preferably rack-cabinet having a height of the order of six feet. The end pieces 54 and 55 fasten to the uprights within the rack-cabinet as is well known.

Rack pieces 53 and 56 are punched with numerous holes as shown in order that superior ventilation be obtained according to this invention. Considering the matter of ventilation, the rather thin vertical construction of each of the plug-in units and the spacing one from the other, side by side, forms a structure having many vertically aligned air flow channels. The chimney effect thereof is pronounced and results in a desirable natural draft for cooling.

Furthermore, the several conforming panels 2 separate the apparatus into two volumes; one behind the panels containing the usual circuit components such as resistors, capacitors, etc., and the other in front of the panels containing the vacuum tubes, power transistors, and possibly other circuit elements of relatively large heat dissipation. When fifteen uniform panels are in place in each rack 50 it is seen that this separation is complete. In forming apparatus from these plug-in building blocks it will be understood that there are times when less than fifteen units are required in a rack. Assuming that two less are required, a separate double-width panel 57 is provided to complete the composite panel surface. These blank panels may be of any width from a single width to many multiples thereof, as may be necessary to fill out the panel area.

It will be understood that when a number of racks 50 are assembled in a housing rack-cabinet known to the art and thus not shown, the separate volumes or cooling flues are completed on four sides. The use of a fan blower and an air filter to pass even more air devoid of dust through the cabinet is also known and coacts effectively with the cooling arrangement of this invention. By employing dampers or air-flow directors as known to the ventilating art, any proportion of forced air flow may be directed to the volume containing the components, with the remaining portion directed to the volume containing the vacuum tubes. In this way the temperatures of the electronic components may be maintained at a value most favorable thereto, and this can be arranged differently from one rack-cabinet to another, in which, for instance, a different number of vacuum tubes may be employed.

At the rear of each of the fifteen positions for plug-in units in each rack 50 there is located a jack 58 which mates with plug 10 on each unit. Each pin 11 enters a female contact such as 59 to establish contact from the components of the unit to supply circuits and to components of other units according to the circuit for the whole apparatus. Only one jack has been shown in Fig. 3 for sake of clarity. Because of the vertical and adjacent arrangement of the several jacks these may be very conveniently wired in multiple fashion; as all ground circuits connecting to the lower contact, all heater circuits to the next two farther up, and so on. The unique structure of this invention is seen to accomplish several desirable objectives.

Further referring to Fig. 3, two vertical reinforcing plates 60 at the rear of the rack are preferably provided for structural rigidity demanded of military type construction and desirable for any end use. It is also noted how the front part of the frame 1 serves as a handle for inserting or removing a unit from the rack and also as a guard for the vacuum tubes. In a rack-cabinet the front door is at least slightly in front of handle 1, as necessary for mechanical reasons. When closed, the door encloses the front volume for control of cooling as has been recited.

The plug-in units in a typical embodiment of this invention are 10" long by approximately 3" high and 1" wide. These dimensions, however, are subject to wide variation both larger and smaller according to the nature of the apparatus; whether for airborne or for ground use, and so on. However, it is apparent that regardless of the size of the structure, the advantages of improved cooling, lightness, simplicity, interchangability, ease of maintenance, inherent rigidity, etc. will be attained.

While the proportions shown are desirable, the circuit entities may be made higher, as to include three vacuum tubes, or less high, as to include only one vacuum tube.

Other materials may be employed and other forms of circuit components, as the fully etched circuit wherein resistors, capacitors and inductors are all formed by the etching technique. Other circuit-forming techniques may also be employed, such as stamping or printing the conductors and/or the circuit elements, or the known manner of connecting using individual wires.

The circuits characterized thus far usually operate in the frequency range of from a few cycles per second to a few megacycles per second. The structure of this invention is suitable, nonetheless, for higher frequencies than these, such as up to decamegacycles per second.

As will be noted by comparing Figs. 1 and 2, the circuit board is located at one side of the frame 1. This provides essentially a "tray" which protects the several components from damage when the individual units are handled or from foreign particles when situated in the rack.

It will be further noted that each of the major structural elements performs highly coactive functions and that holding-down screw devices, heavy channels or other structural redundancies are not to be found in this invention.

Further modifications may be made in the shape, certain aspects of the arrangement, characteristics of the circuit elements, details of circuit connections and alteration of the coactive relative between elements without departing from the scope of this invention.

What is claimed is:

1. A plug-in computer structure comprising a plurality of structurally narrow plug-in units, an open frame housing having only a plurality of spaced aligned notches front and back transversely arranged to hold said units vertically adjacent therein, each of said units having a structurally stiff rectilinearly shaped outer electrically conductive flat strap frame, one structurally stiff electrical connection insulating plug of square cross-section positioned at the rear of said frame, only one insulating surface rigidly connected only to opposite sides of said frame assymetrically at one edge thereof to form a hollow volume for only passive electrical elements on one side thereof, a narrow panel rigidly transversely attached to and enclosing opposite sides of said frame away from said plug, a socket for detachably mounting at least one vacuum tube oriented away from said insulating surface, said socket attached to said panel, the side of said frame opposite said plug constituting an aligned mechanical and electrical shield for vacuum tubes mounted on said panel.

2. A plug-in circuit structure comprising a large plurality of narrow assymetric plug-in units, an open housing having only a plurality of spaced and aligned notches arranged to hold each of said units closely vertically adjacent therein, each of said units having a stiff strap-like outer metallic frame with the maximum dimension of said strap perpendicular to the plane of said frame, a structurally stiff elongated electrical connection plug of insulating material having several linearly aligned cylindrical male connection pins attached at the rear of said unit, a single insulating board attached at opposite sides of said frame at one edge thereof and supporting said plug to form a protective tray for mounting only small circuit components on the side thereof opposite said edge, a narrow metallic panel transversely attached to and extending beyond opposite sides of said frame beyond said board and away from said plug, means to mount not more than two vacuum tubes away from said board attached to and aligned with a side of said panel, the side of said frame opposite said plug forming a rectilinearly shaped permanently attached handle and an aligned mechanical and electrostatic shield for said vacuum tubes.

3. A composite plug-in electronic computer circuit structure comprising a large plurality of narrow plug-in units formed for adjacent vertical disposition, a multiperforate open housing having only four spaced shallow notches aligned to hold each of said units parallel one to the other closely adjacent within said housing, each of said units having only a three-sided strap-like outer metallic frame with the major dimension of said strap at right angles to the plane of said frame, a structurally rigid elongated electrical connection plug formed of insulating material and having several linearly aligned cylindrical connection pins composing the fourth side of said frame, only one stiff etched circuit insulating board riveted only to opposite sides of said frame and to said plug at the edge of said frame and said plug to form a protective tray for holding only passive circuit components on only one side thereof and supporting etched circuit wiring on only the other side thereof, said plug exclusively supported by said insulating board, an elongated metal panel rigidly transversely attached to envelop opposite sides of said frame beyond said circuit board away from said plug, two sockets for mounting vacuum tubes with the bodies thereof away from said circuit board, said sockets attached to said panel in alignment with the elongated dimension thereof, the side of said frame opposite said plug constituting a rectilinearly shaped permanently attached handle for the engagement of said plug in said housing and also constituting an aligned mechanical and electrostatic shield for said vacuum tubes.

References Cited in the file of this patent

UNITED STATES PATENTS

| | | |
|---|---|---|
| 2,158,868 | Stacy | May 16, 1939 |
| 2,411,528 | Dodington | Nov. 26, 1946 |
| 2,486,764 | Singer | Nov. 1, 1949 |
| 2,760,122 | Harris | Aug. 21, 1956 |
| 2,764,713 | Alden | Sept. 25, 1956 |
| 2,788,470 | Giel | Apr. 9, 1957 |
| 2,794,155 | Jones | May 28, 1957 |
| 2,823,372 | Jones | Feb. 11, 1958 |
| 2,864,977 | Witt | Dec. 16, 1958 |
| 2,885,603 | Rose | May 5, 1959 |

FOREIGN PATENTS

| | | |
|---|---|---|
| 203,624 | Australia | Oct. 10, 1956 |

OTHER REFERENCES

Electronic Design, "Design Tips," Apr. 15, 1956; 3 pages.

Electronic Design, "Etched Board," June 1, 1956; 2 pages.